Nov. 9, 1954

L. COLIN 2,693,985

GRIPPING DEVICE FOR THE WHEELS OF TRACTORS OR OTHER VEHICLES

Filed Aug. 1, 1952

INVENTOR·
LOUIS COLIN,

BY

ATTORNEY

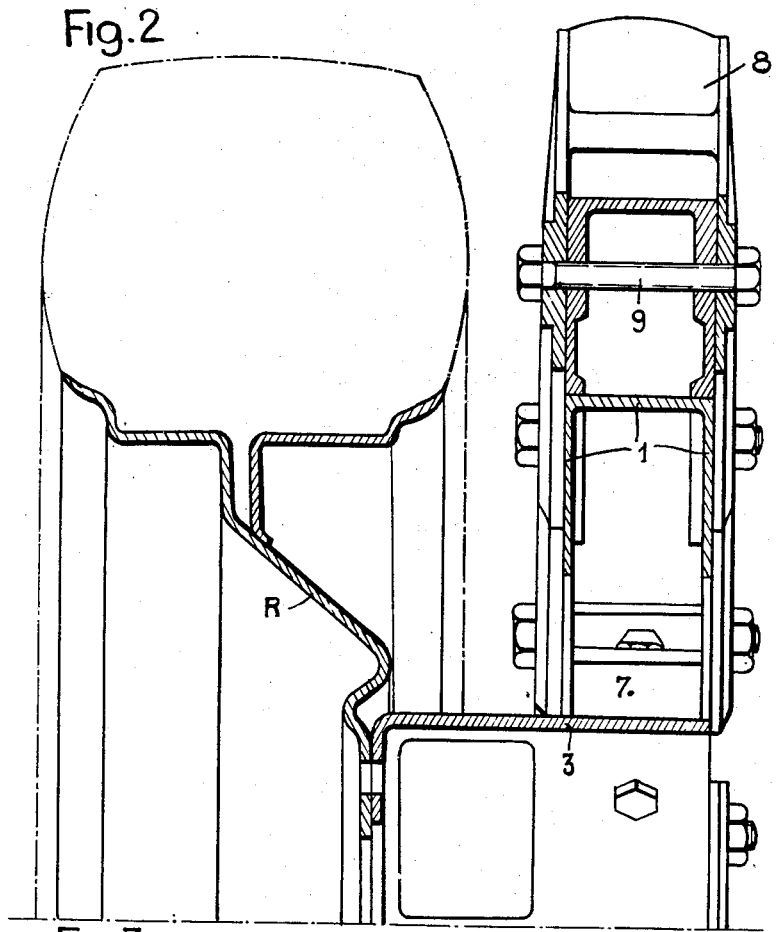
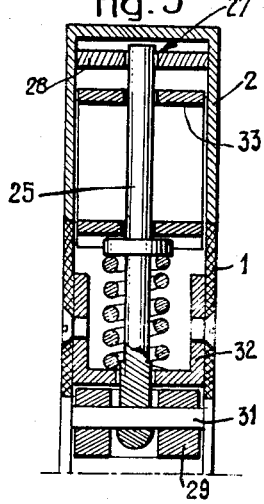
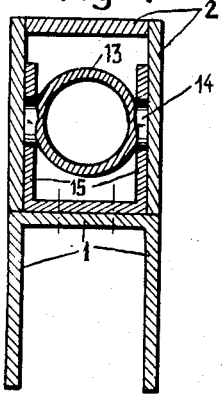
Fig. 2
Fig. 3
Fig. 4

INVENTOR.
LOUIS COLIN,
BY
ATTORNEY

Nov. 9, 1954 — L. COLIN — 2,693,985
GRIPPING DEVICE FOR THE WHEELS OF TRACTORS OR OTHER VEHICLES
Filed Aug. 1, 1952 — 4 Sheets-Sheet 4
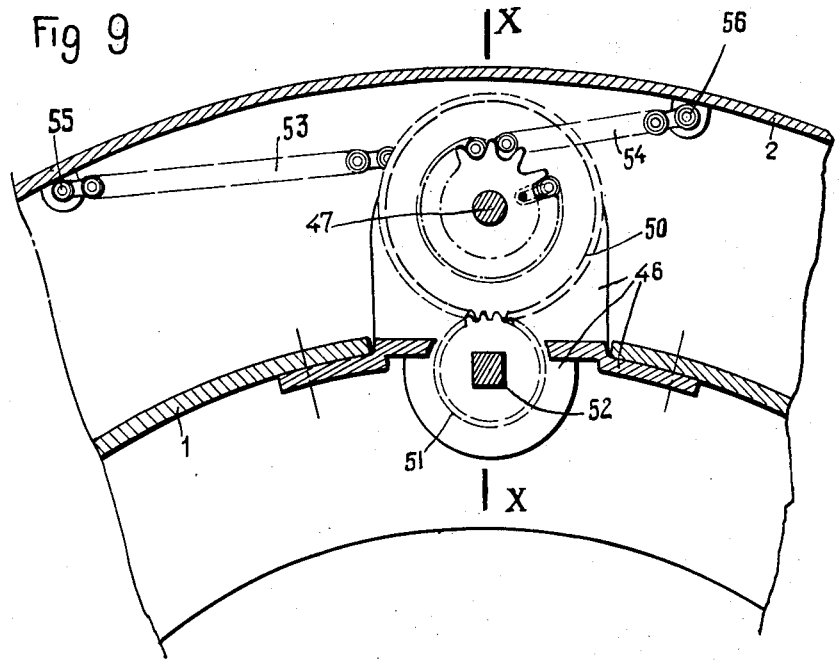
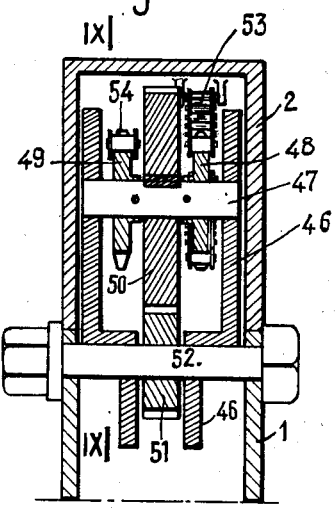
INVENTOR.
LOUIS COLIN,
BY
ATTORNEY

United States Patent Office 2,693,985
Patented Nov. 9, 1954

2,693,985
GRIPPING DEVICE FOR THE WHEELS OF TRACTORS OR OTHER VEHICLES

Louis Colin, Quimper (Finistere), France

Application August 1, 1952, Serial No. 302,121

Claims priority, application France August 14, 1951

6 Claims. (Cl. 301—47)

The present invention relates to improvements in gripping devices for the wheels of tractors or other vehicles and particularly to gripping devices of the kind comprising retractable teeth adapted to be moved from one of two main positions, namely, the operating position in which the teeth protrude beyond the circumference of the wheel tire, and the travelling position in which the teeth are withdrawn within said circumference, the moving of the teeth from one of these two main positions into the other being effected by the rotary motion of an outer movable rim, to which the teeth are connected, relative to a stationary inner rim.

According to the present invention, the stationary rim consists of a U-iron arranged with its flanges turned inwards, and the movable rim consists of a U-iron which surrounds the stationary rim and is also arranged with its flanges turned inwards, the arrangement being such that the movable rim rests with the edges of its flanges on the web of the stationary rim, said mobile rim being filled with lubricant and accommodating the mechanism which controls its movements relative to the stationary rim.

By means of the present invention the rotary motion of the movable rim relative to the stationary rim is facilitated by reason of the lubricant, which is contained in the movable rim, having direct access to the contacting surfaces, and the said controlling mechanism is effectively protected and constantly lubricated.

According to a further feature of the present invention the stationary rim is connected with the vehicle wheel by means of a device which comprises resilient members adapted to damp movements, both radial and circumferential, of the whole gripping device with regard to said wheel.

By means of these arrangements, the impacts to which the gripping device is exposed, especially at the moment when the teeth begin to operate, are transmitted to the wheels only to a small degree, thus extending the useful life of the various parts of the vehicle, especially of the bearings of the wheels.

The movements of the movable rim with regard to the stationary rim can be controlled by two opposed jacks, the cylinder of each jack being connected with a shaft which rests in a fork attached to the stationary rim; inside the mobile rim, the corresponding piston is connected to a shaft which rests on the flanges of the movable rim. Said cylinder is connected to a feeding hopper accommodated in a stationary hoop which contains a feeding connection with a back-pressure valve and a draining connection not provided with a back-pressure valve, a throttle being provided between said second connection and its connection with the jack cylinder.

According to an alternative arrangement, the web of the stationary rim carries on its inside, relative to the movable rim, a curved rack with which meshes a worm, stationary in the longitudinal direction with regard to the mobile rim, and integral with a helicoidal toothed wheel the rotary movement of which is governed by another worm, operable from outside.

This arrangement has the advantage of being irreversible, so that it is unnecessary to provide means for locking the movable rim in the position which it has taken.

According to another alternative arrangement the stationary rim carries two sprocket wheels or two pulleys to which are attached and on which are partially wound one end of each of two chains or cables placed oppositely, the other ends of which are attached at one point to the movable rim; these two wheels or pulleys are integral rotatively with a toothed wheel likewise accommodated inside the movable rim, said toothed wheel meshing with a driving pinion.

In this case, as well in the case in which the mobile rim is governed by jacks, the gripping device is preferably completed by a device for locking the teeth in any desired position, especially in the operating position.

This device consists preferably of a pin which is adapted to engage, under the action of a spring, in one of a series of holes provided in a plate which is integral with the mobile rim, and which can be disengaged by the action of a cam.

Various forms of the gripping device with retractable teeth according to the present invention are shown by way of example in the accompanying drawings wherein:

Figure 2 is a section, on a larger scale, on the line II—II in Figure 1;

Figure 3 is a section on the line III—III in Figure 1;

Figure 4 is a section on the line IV—IV in Figure 1;

Figure 9 is a part sectional view on the lines IX—IX in Figure 10 of a third embodiment of the invention;

Figure 10 is a section on the lines X—X in Figure 9.

Figure 1:
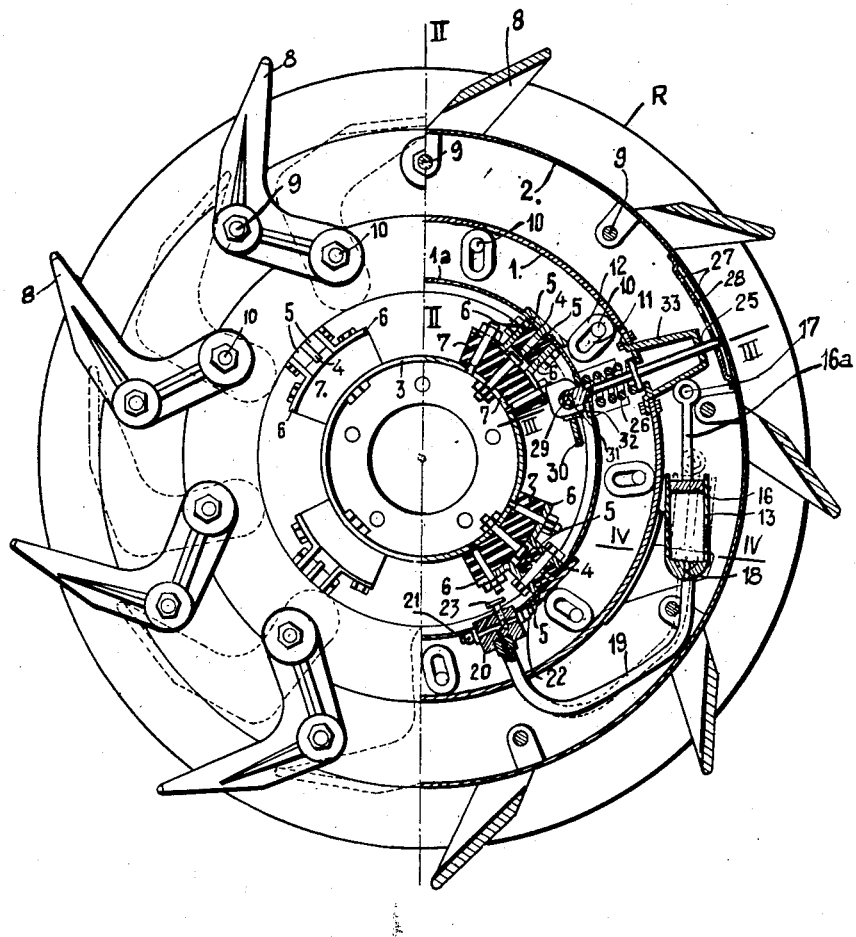
Figure 1 illustrates one embodiment of the invention partly in elevation and partly in section with the teeth in the operative position.
Figure 5:
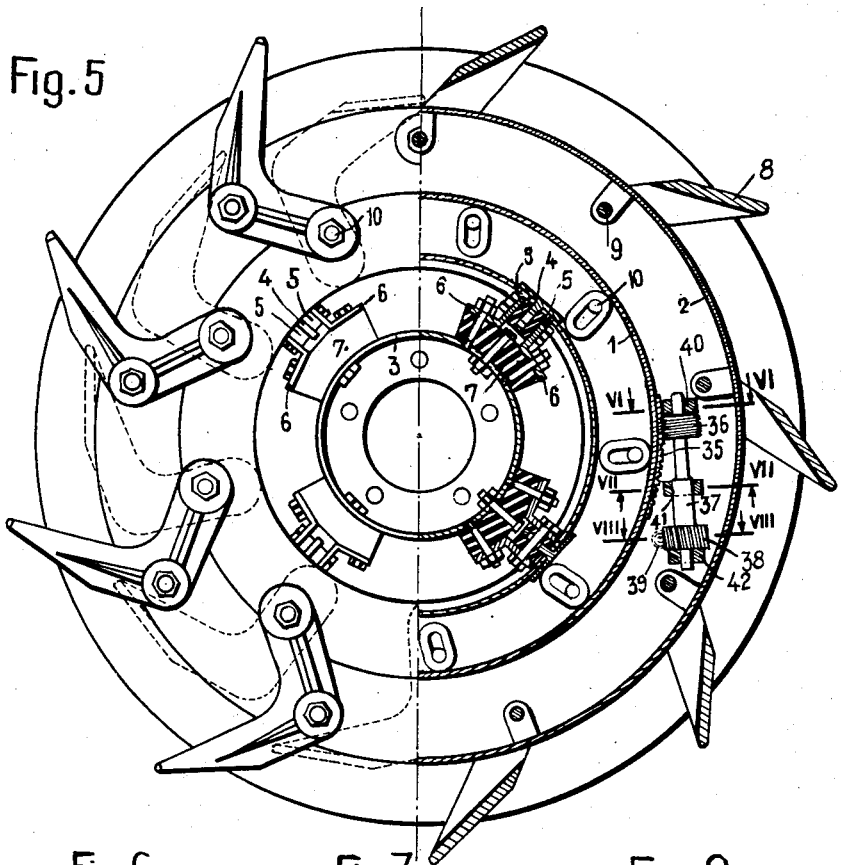
Figure 5 illustrates a further embodiment of the invention partly in elevation and partly in section.
Figure 6:
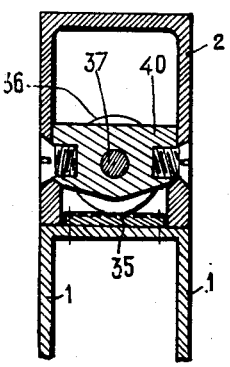
Figures 6, 7 and 8 are partial sections on a larger scale on the lines VI—VI, VII—VII, and VIII—VIII respectively in Figure 5.
Figure 7:
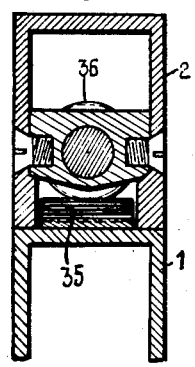
Figure 8:
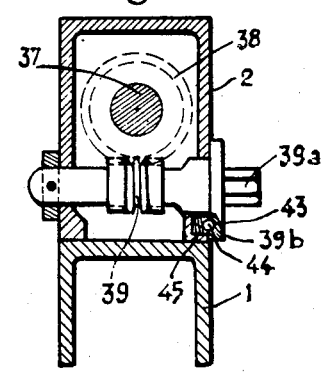

In this drawing 1 indicates an inner stationary rim consisting of an U-iron the flanges of which are turned inwards, and 2 an outer movable rim, likewise consisting of an U-iron the flanges of which are likewise turned inwards and adapted to slide on the web of the rim 1.

The inner space of the stationary rim 1 is closed by a metal sheet 1a which protects the enclosed members against dust and dirt.

The inner space of the movable rim 2 is closed by the web of the stationary rim 1 and is filled with lubricant. This space also accommodates members which are described hereinafter and which control the movements of the movable rim 2 relative to the stationary rim 1.

The stationary rim 1 is resiliently connected to an intermediary rim 3 which is rigidly attached by bolts to the web of the wheel R.

According to the embodiment illustrated in Figure 1, T-irons 4 are welded at their ends to the flanges of the stationary rim 1. The web of each of these T-irons 4 is placed in the radial direction and is flanked by two plates 5 of rubber or the like resilient material, the whole being attached by a bolt to the radial flanges of two gussets 6, the other flanges of which are attached to the intermediate rim 3 by bolts or threaded gudgeons, a block 7 of rubber or the like resilient material being interposed. In this way movements of the gripping device relative to the wheel R, both radial and circumferential, are damped.

The retractable teeth 8 consist of L-shaped forks the jaws of which straddle the mobile rim 2 and which are hinged on a shaft 9, the latter traversing the flanges of said movable rim 2.

The L-shaped forks are either connected with a small connecting rod, the latter being in turn connected to a shaft which is journalled in the stationary rim 1, or alternatively, as shown in the drawing, interconnected by a shaft 10 which traverses curved openings provided in the flanges of said stationary rim 1. Preferably a small annular piece of metal 11 is placed in each curved opening in which the shaft 10 can move and which is surrounded by another annular piece 12 of rubber, embedded in the flanges of the stationary rim 1.

The device for controlling the movements of the mobile rim 2 relative to the stationary rim 1 will now be described with reference to Figure 1.

This device contains two oppositely mounted jacks controlling said rim, one in one direction and the other in the other direction. The jack 13 only is shown in Figure 1. Its cylinder (see Figure 4) is integral with a cross-shaft 14 which is journalled in the jaws of a fork 15, the latter being continguous with the web of the stationary rim 1 but embedded in the movable rim 2. The rod 16a of the piston 16 is connected with a shaft 17, the latter being journalled in the flanges of the movable rim 2. The base of the cylinder 13 is provided with an orifice 18 connected by means of a flexible pipe 19 to the feeding hopper 20. The latter contains a connection 21 with a back-pressure valve, and another connection 22 not provided with a back-pressure valve; a throttle such as a threaded bolt, is provided between said second connection and its connection with the pipe 19.

The metal sheet 1a which closes the inside space of the stationary rim 1, is of course provided with removable parts allowing access to the connections 21 and 22. The throttle 23 is visible.

Provided that said movable rim 2 is unlocked, it suffices, in order to move the teeth from the operating position to the retracted position, that is to say to the traveling position, to connect an oil pump to the connection 21 of the hopper 20 on the left (not shown) and to connect a drain pipe to the connection 22 of the right-hand hopper and to the pump said drain pipe leading back to the tank of said pump, to open the throttle 23. Oil pumped into the left-hand jack moves its piston in the clockwise direction, so that the mobile rim 2 moves in the same direction, thus retracting the teeth; the right-hand piston returns into its cylinder and the oil thus compressed is evacuated through the connection 22 towards the tank of the pump.

One could also use one jack only, without a pump. To this end it would suffice to move the vehicle in the corresponding direction after having opened the throttle 23. In this case the teeth would be retracted automatically by the reaction exerted by the surface of the road or field; the piston would return as described above, and the oil would be evacuated through the connection 22.

In order to lock the movable rim 2 in any desired position, according to this method of operation, a device is used which contains (see Figures 1 and 3) a pin 25 adapted to engage, under the action of the spring 26, one of a series of holes 27 provided in a plate 28 which is integral with the movable rim 2, and which can be disengaged by the action of a cam 29 operated by a lever 30. This cam turns round a shaft 31 which traverses the pin 25 and which rests on the fork 32, the latter being rigidly attached to the stationary rim 1. The pin 25 is guided across said fork in a stirrup 33 rigidly attached to the stationary rim 1 but extending inside the movable rim 2.

According to the embodiment illustrated in Figures 5 to 8, the movements of the movable rim relative to the stationary rim are controlled in the following way:

The stationary rim 1 carries on the side facing the movable rim a rack 35 which meshes with a worm 36, the latter being rigidly connected through a rod 37 with a toothed wheel 38 which meshes with another worm 39, operable from outside by means of a spanner or ratchet brace applied to the head 39a. The assembly 36—37—38 is carried by collar bearings 40, 41, 42 embedded in the flanges of the mobile rim 2. Rotation of the worm 39 in one direction will cause the extension of the teeth 8, while rotation of the worm 39 in the opposite direction will cause the retraction of the teeth 8.

As this system is not reversible, it is not necessary to provide means for locking the movable rim 2 in any of its positions. Nevertheless, in order to assist the operator to determine certain positions, notches 43 may be provided in the head 39b of the worm 39 in which a ball 44 acted upon by the spring 45 can engage.

According to the embodiment shown in Figures 9 and 10, the stationary rim 1 carries a fork 46 one part of which is straddled by the flanges of said stationary rim whilst its other part is straddled by the flanges of the movable rim 2. The latter carries a shaft 47 on which are keyed two sprockets 48 and 49 and a toothed wheel 50; the latter meshes with a driving pinion 51 the shaft 52 of which protrudes from the stationary rim 1 and can be operated from outside by means of a spanner. Two oppositely placed chains 53 and 54 are attached to and partially wound on the sprocket wheels 48 and 49; the other ends of said chains are attached at points 55 and 56 to the movable rim 2.

In Figure 9 the chain 54 is completely wound up, and the teeth are in the operative position in which they completely protrude from the wheel tire. In order to retract the teeth, it suffices to turn the shaft 52 in the winding up direction of the chain 53, thus causing a displacement of the movable rim 2 to the right and the unwinding of the chain 54.

If such a system of operation is used, it is desirable to be able to lock the movable rim 2 in any position; for this purpose the locking system described with reference to Figures 1 and 3 may be used. When this device is in the unlocked position, the teeth can be retracted by moving the vehicle.

It will be understood that the invention is not limited to the embodiments which have been described and shown, but extends also to constructional modifications thereof, within the scope of the appended claims.

I claim:
1. A gripping device for the wheels of tractors and other vehicles, comprising a stationary rim adapted to be secured to the vehicle wheel, a movable rim rotatably mounted on the peripheral surface of said stationary rim, retractable teeth pivotally mounted on said movable rim, means hingedly connecting said teeth to said stationary rim in such manner that said teeth are retracted, or extended beyond the tread of the tyre on said vehicle wheel, according to the angular position of said movable rim with respect to said stationary rim, said stationary rim being a U-iron arranged with its flanges turned inwards, and said movable rim bing a U-iron arranged with its flanges turned inwards, the edges of said flanges of the movable rim resting on the web of said stationary rim so that said movable rim and the web of said stationary rim enclose a capacity adapted to be filled with lubricant, and mechanism accommodated in said capacity for angularly displacing said movable rim with respect to said stationary rim.

2. A gripping device as claimed in claim 1, comprising connecting means for connecting said stationary rim to the vehicle wheel and resiliently compressible elements included in said connecting means and adapted to damp both radial and circumferential movements of the whole gripping device with respect to said wheel.

3. A gripping device as claimed in claim 1, comprising a plate integral with said movable rim and formed with a series of holes, a locking pin slidably mounted on said stationary rim and adapted to engage any one of said holes, a spring urging said pin into engagement with said hole and means for disengaging said pin from said hole.

4. A gripping device as claimed in claim 1, in which said mechanism comprises two opposed jacks, the cylinder of each of said jacks being connected with a shaft which rests in a fork joint attached to the stationary rim, inside the movable rim, the corresponding piston being connected with a shaft which rests in the flanges of the movable rim, and said cylinder being connected to a feeding hopper accommodated in the stationary rim which contains a feeding connection with a back-pressure valve and a draining connection, a throttle being provided between said draining connection and its connection with the jack cylinder.

5. A gripping device as claimed in claim 1, in which said mechanism comprises a curved rack located in said movable rim and secured to the web of said stationary rim, a worm meshing with said rack, said worm being rotatably mounted in said movable rim and stationary in the longitudinal direction relative to said movable rim, a toothed wheel integral with said worm, a worm wheel meshing with said toothed wheel and means for rotating said worm wheel from outside said movable rim.

6. A gripping device as claimed in claim 1, in which said mechanism comprises two sprockets rotatably mounted on said stationary rim, a first chain having one of its ends attached to the first of said sprockets, being partially wound in one direction on said first sprocket and having its other end attached to said movable rim, a second chain having one of its ends attached to the second of said sprockets, being partially wound in the opposite direction on said second sprocket and having its other end attached to said movable rim, a toothed wheel connected for common rotation with said sprockets and a driving pinion meshing with said toothed wheel.

References Cited in the file of this patent

UNITED STATES PATENTS

| Number | Name | Date |
|---|---|---|
| 2,249,138 | Hill | July 15, 1941 |

FOREIGN PATENTS

| Number | Country | Date |
|---|---|---|
| 987,217 | France | Apr. 11, 1951 |